(12) United States Patent
Villena et al.

(10) Patent No.: US 6,832,203 B1
(45) Date of Patent: Dec. 14, 2004

(54) SKILLS BASED CONTACT ROUTING

(75) Inventors: Jose Villena, Miami, FL (US); Eyal Ben-Chanoch, Miami, FL (US)

(73) Assignee: CIM, Ltd., San Francisco, CA (US)

( * ) Notice: Subject to any disclaimer, the term of this patent is extended or adjusted under 35 U.S.C. 154(b) by 0 days.

(21) Appl. No.: 09/435,223

(22) Filed: Nov. 5, 1999

(51) Int. Cl.[7] .............................................. G06F 17/60
(52) U.S. Cl. ............. 705/8; 705/9; 705/1; 379/265.01; 379/265.02; 379/265.05; 379/265.11; 379/265.12; 379/265.13
(58) Field of Search ............................... 705/8; 379/265

(56) References Cited

U.S. PATENT DOCUMENTS

| | | |
|---|---|---|
| 3,333,271 A | 7/1967 | Robinson et al. ............ 343/113 |
| 4,066,847 A | 1/1978 | Giordano ...................... 179/99 |
| 4,286,118 A | 8/1981 | Mehaffey et al. ......... 179/18 D |
| 4,356,348 A | 10/1982 | Smith ...................... 179/1 MN |
| 4,392,129 A | 7/1983 | Mehaffey et al. ........... 340/765 |
| 4,408,100 A | 10/1983 | Pritz et al. ................. 179/27 D |
| 4,477,698 A | 10/1984 | Szlam et al. ........... 179/90 BD |
| 4,494,229 A | 1/1985 | Jolissaint ..................... 370/58 |
| 4,510,351 A | 4/1985 | Costello et al. ........... 179/27 D |
| 4,540,855 A | 9/1985 | Szlam et al. ............... 179/84 R |
| 4,593,273 A | 6/1986 | Narcisse ..................... 340/539 |
| 4,599,493 A | 7/1986 | Cave ...................... 179/18 FH |
| 4,600,814 A | 7/1986 | Cunniff et al. .......... 179/18 BC |
| 4,677,663 A | 6/1987 | Szlam ......................... 379/211 |
| 4,692,858 A | 9/1987 | Redford et al. ............. 364/200 |
| 4,694,483 A | 9/1987 | Cheung ....................... 379/34 |
| 4,720,853 A | 1/1988 | Szlam ......................... 379/211 |
| 4,742,537 A | 5/1988 | Jesurum ...................... 379/351 |
| 4,742,538 A | 5/1988 | Szlam ......................... 379/361 |
| 4,742,539 A | 5/1988 | Szlam ......................... 379/377 |
| 4,757,267 A | 7/1988 | Riskin ......................... 379/113 |
| 4,782,463 A | 11/1988 | Sanders ...................... 364/900 |
| 4,782,510 A | 11/1988 | Szlam ......................... 379/88 |
| 4,792,968 A | 12/1988 | Katz ............................ 379/92 |
| 4,797,911 A | 1/1989 | Szlam et al. .................. 379/67 |

(List continued on next page.)

FOREIGN PATENT DOCUMENTS

| | | | |
|---|---|---|---|
| EP | 0855826 | 7/1998 | ............ H04M/3/50 |
| EP | 0855826 A2 * | 7/1998 | ............ H04M/3/50 |

OTHER PUBLICATIONS

Wilson, Tim. "The call center industry: wired or tired?," Business Communications Review, v. 28 no8 p. 20. Aug. 1998.*

"Octel Network Services Saves $500,000 With Teknekron System," Phillips Business Information (Newsletter), vol. 15, Issue 13. Jun. 25, 1996.*

"3COM: CelllT launches breakthrough multimedia call center solution based on high-speed 3Com systems," M2 Presswire, Mar. 1998.*

"In the forefront with integrated call centers," AT&T Technology, 1992.*

"How a travel-industry call center excels," Telemarketing & Call Center Solutions, Sep. 1997.*

M2 Presswire, 3COM: Cell IT launches breakthrough multimedia call center solution based on high speed 3Com systems; Mar. 4, 1998; 1–3 webpages; Coventry.

AT & T Technology; In The Forefront With Integrated Call Centers; Winter 1992; 1–7 webpages; New York.

Telemarketing & Call Center Solutions; How a Travel-Industry Call Center Excels; Sep 1997; 1–2 webpages; Norwalk.

*Primary Examiner*—Tariq R. Hafiz
*Assistant Examiner*—Catherine M. Colón
(74) *Attorney, Agent, or Firm*—Borque & Associates, P.A.

(57) ABSTRACT

A contact (call) center technique matches the best available contact center agent with contacts requiring particular services. As contacts arrive, skills required for each service or contact are correlated with skills possessed by agents, and the best available agent is assigned to process the contact.

11 Claims, 3 Drawing Sheets

U.S. PATENT DOCUMENTS

| | | | | |
|---|---|---|---|---|
| 4,811,240 A | | 3/1989 | Ballou et al. | 364/518 |
| 4,829,563 A | | 5/1989 | Crockett et al. | 379/309 |
| 4,858,120 A | | 8/1989 | Samuelson | 364/401 |
| 4,866,638 A | | 9/1989 | Cosentino et al. | 364/521 |
| 4,881,261 A | | 11/1989 | Oliphant et al. | 379/215 |
| 4,894,857 A | | 1/1990 | Szlam et al. | 379/67 |
| 4,896,345 A | | 1/1990 | Thorne | 379/67 |
| 4,933,964 A | | 6/1990 | Girgis | 379/67 |
| 4,939,771 A | | 7/1990 | Brown et al. | 379/67 |
| 4,939,773 A | | 7/1990 | Katz | 379/204 |
| 4,988,209 A | | 1/1991 | Davidson et al. | 370/58 |
| 5,021,976 A | | 6/1991 | Wexelblat et al. | 364/521 |
| 5,041,992 A | | 8/1991 | Cunningham et al. | 364/518 |
| 5,062,103 A | | 10/1991 | Davidson et al. | 370/58.1 |
| 5,070,525 A | | 12/1991 | Szlam et al. | 379/196 |
| 5,115,501 A | | 5/1992 | Kerr | 395/600 |
| 5,119,072 A | | 6/1992 | Hemingway | 340/573 |
| 5,119,475 A | | 6/1992 | Smith et al. | 395/156 |
| 5,121,477 A | | 6/1992 | Koopmans et al. | 395/156 |
| 5,175,761 A | | 12/1992 | Ramsey et al. | 379/89 |
| 5,179,657 A | | 1/1993 | Dykstal et al. | 395/161 |
| 5,179,700 A | | 1/1993 | Aihara et al. | 395/650 |
| 5,181,236 A | | 1/1993 | LaVallee et al. | 379/67 |
| 5,206,903 A | * | 4/1993 | Kohler et al. | 379/265.12 |
| 5,214,688 A | | 5/1993 | Szlam et al. | 379/67 |
| 5,276,731 A | | 1/1994 | Arbel et al. | 379/88 |
| 5,309,505 A | | 5/1994 | Szlam et al. | 379/88 |
| 5,309,513 A | | 5/1994 | Rose | 379/265 |
| 5,335,269 A | | 8/1994 | Steinlicht | 379/266 |
| 5,345,589 A | | 9/1994 | King et al. | 395/650 |
| 5,357,254 A | | 10/1994 | Kah | 342/42 |
| 5,386,412 A | | 1/1995 | Park et al. | 370/53 |
| 5,428,827 A | | 6/1995 | Kasser | 455/161.3 |
| 5,430,792 A | | 7/1995 | Jesurum et al. | 379/67 |
| 5,440,616 A | | 8/1995 | Harrington et al. | 379/88 |
| 5,490,211 A | | 2/1996 | Adams | 379/265 |
| 5,500,891 A | | 3/1996 | Harrington et al. | 379/265 |
| 5,511,112 A | | 4/1996 | Szlam | 379/88 |
| 5,511,117 A | | 4/1996 | Zazzera | 379/265 |
| 5,519,773 A | | 5/1996 | Dumas et al. | 379/265 |
| 5,533,109 A | | 7/1996 | Baker | 379/201 |
| 5,535,270 A | | 7/1996 | Doremus et al. | 379/266 |
| 5,546,456 A | | 8/1996 | Vilsoet et al. | 379/265 |
| 5,553,133 A | | 9/1996 | Perkins | 379/265 |
| 5,568,544 A | | 10/1996 | Keeler et al. | 379/273 |
| 5,579,368 A | | 11/1996 | Berkum | 379/15 |
| 5,581,602 A | | 12/1996 | Szlam | 379/67 |
| 5,586,178 A | | 12/1996 | Koenig | 379/265 |
| 5,588,045 A | | 12/1996 | Locke | 379/67 |
| 5,594,781 A | | 1/1997 | Kozdon et al. | 379/60 |
| 5,594,791 A | | 1/1997 | Szlam et al. | 379/265 |
| 5,619,557 A | | 4/1997 | Berkum | 379/88 |
| 5,623,540 A | | 4/1997 | Morrison et al. | 379/115 |
| 5,675,637 A | | 10/1997 | Szlam et al. | 379/142 |
| 5,689,240 A | | 11/1997 | Traxler | 340/573 |
| 5,696,818 A | | 12/1997 | Doremus et al. | 379/265 |
| 5,714,932 A | | 2/1998 | Castellon et al. | 340/539 |
| 5,715,307 A | | 2/1998 | Zazzera | 379/265 |
| 5,722,059 A | | 2/1998 | Campana | 455/226.2 |
| 5,722,064 A | | 2/1998 | Campana | 455/351 |
| 5,729,600 A | | 3/1998 | Blaha | 379/265 |
| 5,742,233 A | | 4/1998 | Hoffman et al. | 340/573 |
| 5,815,565 A | | 9/1998 | Doremus et al. | 379/265 |
| 5,825,283 A | | 10/1998 | Camhi | 340/438 |
| 5,825,869 A | * | 10/1998 | Brooks et al. | 379/265.12 |
| 5,828,731 A | | 10/1998 | Szlam | 379/88 |
| 5,832,059 A | | 11/1998 | Aldred et al. | 379/34 |
| 5,832,070 A | | 11/1998 | Bloom et al. | 379/265 |
| 5,857,014 A | | 1/1999 | Sumner et al. | 379/93.02 |
| 5,864,615 A | | 1/1999 | Dezonno | 379/265 |
| 5,894,857 A | | 4/1999 | Shimada et al. | 137/395 |
| 5,940,494 A | | 8/1999 | Rafacz | 379/265 |
| 5,963,635 A | | 10/1999 | Szlam et al. | 379/309 |
| RE36,416 E | | 11/1999 | Szlam et al. | 379/88.09 |
| 5,991,394 A | | 11/1999 | Dezonno et al. | 379/265 |
| 6,044,146 A | * | 3/2000 | Gisby et al. | 379/266.02 |
| 6,044,355 A | * | 3/2000 | Crockett et al. | 705/8 |
| 6,118,763 A | | 9/2000 | Trumbull | 370/231 |
| 6,134,530 A | * | 10/2000 | Bunting et al. | 705/7 |
| 6,157,655 A | * | 12/2000 | Shtivelman | 370/412 |
| 6,269,153 B1 | * | 7/2001 | Carpenter et al. | 379/88.02 |
| 6,272,347 B1 | * | 8/2001 | Griffith et al. | 455/445 |
| 6,314,089 B1 | | 11/2001 | Szlam et al. | 370/270 |
| 6,359,892 B1 | | 3/2002 | Szlam | 370/401 |
| 6,359,982 B1 | * | 3/2002 | Foster et al. | 379/226.06 |
| 6,362,838 B1 | | 3/2002 | Szlam et al. | 345/762 |
| 6,424,709 B1 | * | 7/2002 | Doyle et al. | 379/265.02 |
| 2002/0047859 A1 | | 4/2002 | Szlam et al. | 345/705 |
| 2002/0067822 A1 | * | 6/2002 | Cohen et al. | 379/265.12 |
| 2002/0143878 A1 | | 10/2002 | Birnbaum et al. | 709/205 |
| 2002/0145624 A1 | | 10/2002 | Szlam et al. | 345/738 |
| 2002/0161896 A1 | | 10/2002 | Wen et al. | 709/227 |

* cited by examiner

|  | SK1 (POLISH) | SK2 (REPLACEMENT PART KNOWLEDGE) | SK3 (FRANCHISE PROCDEDURES) | ... | | | |
|---|---|---|---|---|---|---|---|
|  | 1-10 | 1-3 | 1-2 | | | | |
|  | SER1 | SER2 | SER3 | ... | | | |
|  | 1-20 SK1(10)<br>1-30 SK2(20)<br>1-25 SK3(-) | SK1(5)<br>(-)<br>SK3(20) | (-)<br>SK3(5) | | | | |
|  | AG1 | AG2 | AG3 (FRANCHISE PARTY POLISH) | ... | | | |
| SK1 | 3 | 7 | 6 | | | | |
| SK2 | 2 | 3 | 1 | | | | |
| SK3 | 2 | 1 | 2 | | | | |

201 — N-DIMENSIONAL VECTOR SPACE
202
205 — LABEL?
205a
206
207 — LABEL?
208

FIG. 2

| SER1 | SER2 | SER3 | ⋮ |
|---|---|---|---|
| AG 15<br>AG 20<br>AG 4<br>⋮ | AG 6<br>AG 13<br>AG 42 | AG 2<br>AG 68<br>AG 21 | |

FIG. 3

SKILLS BASED CONTACT ROUTING

TECHNICAL FIELD

This invention relates to call center technology, and more generally, to contact center technology which allows different types of contacts to be serviced by the agent or other contact service employee most suited to service said contact.

BACKGROUND OF THE INVENTION

Call center technology is well-known in the art and is critical to many large corporations providing service to their customer base. Call centers typically comprise a plurality of call center agents which service incoming customer inquiries, complaints, etc. A typical example of a large call center might be an airline reservation system, a credit card company, etc.

Recently, the call centers are more appropriately referred to as contact centers. This change in name is because the call centers may service more than just incoming or outgoing telephone calls. Rather, the call centers may also be involved in servicing other types of agent/customer interaction, such as web chat, e-mail, etc. Ideally, the call center architecture and logistics should provide the best possible service for all of these types of contacts.

In a large call center, there may be dozens or hundreds of different types of incoming and outgoing contacts. Additionally, complicating things more is the fact that dozens or hundreds of call center agents may have a variety of different skills. These skills permit certain agents to service particular types of contacts better or worse than other agents. In order to insure the best possible service for each contact, it is highly desirable to route contacts to agents best suited to service the particular type of need required by the particular customer that is the subject of the contact.

Some prior art systems use what is termed "skills routing" in an attempt to match calls with the agents best suited to service those calls. One common technique is to maintain different pools of agents depending upon the particular types of contacts expected. The contacts are then examined and routed to a pool of agents possessing those particular skills.

An example of the foregoing might be Spanish language. If a contact center anticipated that some callers require Spanish language agents with which to interact, then a Spanish pool might be set up. Calls coming in which indicate a Spanish speaking customer would be routed to the pool of Spanish speaking agents.

One problem with such a system is that even within the Spanish language speaking customers, there may be different types of services required. For example, there may be Spanish speaking customers calling up with questions about extra charges on their credit card, and there may be an additional group of Spanish speaking agents calling up to report lost or stolen cards. The groups of the Spanish speaking agents to handle these two types of calls may be different, and different agents may have different skills in this regard. In order to solve such a problem, the prior art call center technology would simply create two different pools of Spanish speaking agents. One for handling lost or stolen credit card reports, and another for inquiries regarding credit card charges.

One problem with the foregoing is that the number of pools of agents required grows rapidly as the number of different contacts grows. For example, a contact center requiring six different types of processes in ten different languages would require sixty pools of agents to handle those calls. Moreover, there is still no guaranty that the best agent will be assigned to the particular contact.

In view of the foregoing, there exists a need in the art for an improved technique of contact center processing which permits the optimal match between an available agent and a contact to be serviced.

Ideally, any such implementation should be flexible to allow for the addition and removal of agents, contact types, etc. Moreover, any solution should provide maximum control over the process of matching the best agents to service contacts that they are best suited to process.

SUMMARY OF THE INVENTION

The above and other problems of the prior art are overcome and a technical advance is achieved in accordance with the present invention which relates to processing contact center contacts in a manner which maps the best available agent to any particular contact. In accordance with the technique, each type of possible contact (service), corresponds to an N-dimensional service vector. Each dimension of the N-dimensional vector space represents a different skill required to process that particular type of contact or service. The magnitude of the service vector in any dimension represents the importance of the skill represented by the dimension to the processing of the contact.

Each agent is also assigned a similar vector, the agent vector representing in each dimension that particular agent's proficiency level in the skill represented by that dimension. The system then calculates a dot product between each agent vector and each service vector, the dot product being termed herein a skill score. Each agent is assigned a plurality of skill scores, one for each type of service that the agent can process. In a preferred embodiment, if an agent can not do at all any particular skill required for a service, then the agent may not be used for that service at all.

When a call arrives, the system immediately ascertains the type of service required. Thereafter, the call center assigns to process that contact or service the available agent with the highest skill score for that service.

The above technique insures that the agent assigned to the call is the available agent which has the best skills in the areas that are most important to process that call. An agent with high proficiency in a skill that is extremely important to a particular type of service will be preferably assigned to a particular contact over a different agent with slightly better proficiency in a skill which is much less important to the particular service. The system results in each contact being serviced by the agent whose profile (i.e., set of skills scores) shows that the agent is the best agent available to service that particular contact.

In various embodiments values assigned to each skill may vary, or the values of each dimension of the service vector and agent vector may be normalized to a common scale. Additionally, contacts may be of any type, including inbound calls, outbound, e mail, web chat, videoconferencing, or any other type of agent user interaction.

BRIEF DESCRIPTION OF THE DRAWINGS

FIG. 2 is a table depicting assignments of skills proficiency levels to services and to agents; and FIG. 3 is a plurality of service queues for use with the invention.

DETAILED DESCRIPTION OF THE PREFERRED EMBODIMENT

Figure 1:
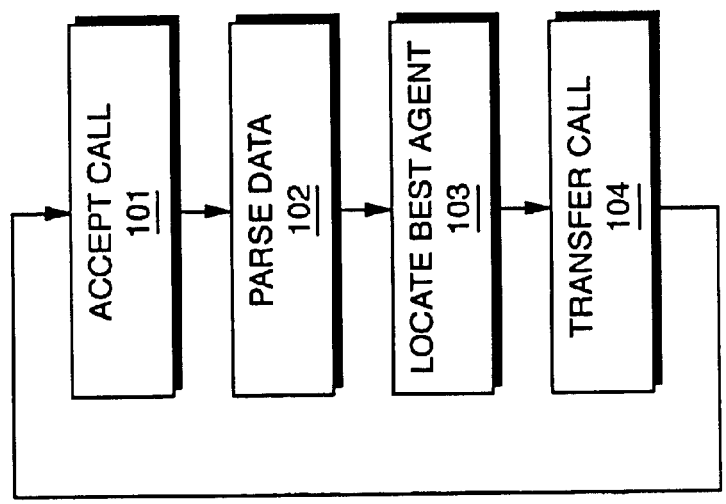
FIG. 1 is a basic flow chart of functional steps of processing a contact in accordance with the present invention.

FIG. 1 shows a basic flow diagram of the processing of a particular contact at a contact center constructed in accordance with the techniques of the present invention. The contact center accepts the exemplary call at 101 and parses the information available from the call in order to determine the service (contact type). The block 102 may utilize ANI, account identification data entered by a user, or any other information in order to ascertain the type of service required for processing the particular call. Once that is ascertained, the best available agent is located for processing that call at block 103. The call is then transferred for processing at block 104.

FIG. 3 shows a plurality of service queues, one for each of the different types of services offered by the contact center. In service queue 1, agent 15, agent 20 and agent 4 are shown as available. Each of the other service queues shows a set of three exemplary agents also available to process contacts of the particular type represented by the service in issue.

In operation, the simplest technique of allowing block 103 of FIG. 1 to choose the best available agent is to simply order the available agents in the queues by their skills score with respect to that service. For example, using such a technique, agent 15, agent 20 and agent 4 have the highest, next highest, and third highest skills score with respect to service 1, respectively, as shown in FIG. 3. By utilizing such an ordering technique, the selection of the best agent is simply a matter of traversing the list from top to bottom and picking the first idle available agent. Thus, when a contact is to be serviced, it is immediately apparent to whom the call should be assigned. Although simple and efficient, the invention is not limited to this technique and any of a variety of other techniques may be utilized for selection of the agent with the highest skills score for a particular service.

The creation of the table shown in FIG. 3 involves four basic steps. The first is the basic definition of the skills required, the second is the assignment of those skills to agents, the third is the definition of the skills, and the skill vector, for a particular service types, and the fourth is the calculation of N-dimensional dot products to produce the ordered table shown in FIG. 3. We address each of these separately below.

The skills set definition steps involves defining all of the different types of possible skills required for all of the different types of services a particular contact center offers. FIG. 2 shows a line 201 with three exemplary skills, Polish language, knowledge of replacement parts, and franchisee procedures. Each of the skills has a particular level, such as Polish where the skills are defined to be one (the worst) through ten (fluent speaking, reading and writing). The lines 201 and 202 of FIG. 2 indicate for each skill, the different proficiency levels within that skill. Thus, with respect to knowledge of franchise procedures to process callers interested in opening a franchise, there are only two skill levels, one and two.

The arrangement of lines 201 and 202 of FIG. 2 could be thought of conceptually as defining the N-dimensional vector space within which the process will take place. Each of the N-dimensions is represented by one of the skills.

Once the skills are defined, the agents are each given a proficiency level with respect to each skill. As shown by lines 207 and 208 of FIG. 2, exemplary agent 3 speaks Polish slightly better than average (6 out of 10), has minimal skills in replacement part knowledge and has top skills in franchisee procedures, scoring a 2 in this category. Lines 207 and 208 also show different skill levels for each particular agent with respect to each skill.

The third parameter which must be defined is the relative importance of each of the particular types of skills for processing each service. These values of the relative importance of each are shown in conceptual format at lines 205, 205a and 206 of FIG. 2. Each of the skills can be rated in lines 205 and 206 with a number in any range set in advance. Exemplary ranges are shown in the left-hand column of lines 205–206. For example, a skill may have five values, one through five, or may have six values one, five, six, seven, eight and twenty. In the latter case, the highest skill twenty is much better than any of the other skill levels, but skill levels five, six, seven and eight differ only slightly from each other. By assigning the different possible proficiency levels to different particular skills, the system is more flexible. Specifically, the system allows for a situation where a particular agent that has a certain minimum proficiency or better at a particular skill is deemed to be much better than agents of varying proficiency levels in that skill which are below a minimum threshold.

Finally, the agents skill profile is formed by calculating a vector (dot) product between each agent and each different service vector. This provides a measure of how closely the agents skills match the skills required to handle a particular contact.

In an enhanced embodiment, an exception is made to the foregoing procedure. Specifically if an agent has zero proficiency in a particular skill, he will not be assigned to process a contact requiring that skill at any level. This prevents an agent from being assigned a contact which requires a particular skill, even at a low level, but which the agent has no ability to process. Moreover, in an additional embodiment, a minimum proficiency level for each skill is defined. Thus, whether or not an agent vector and service vector produce a large dot product, if the agent vector does not have a particular specified minimum proficiency for each particular skill required by a service, the agent will not be assigned contacts that require that service, even if the relevant agent vector and service vector produce a relatively large dot product. These additional embodiments insure that when a contact comes in, the best available agent is assigned to that contact. However, that agent is chosen from a pool of agents each of which has, at the very least, a minimum set of proficiencies in all of the relevant skills required to handle that particular contact.

Skills may be updated and amended at various times during system operation. Whenever an agent is added, the set of skills possessed by that agent will be entered into the system, and the appropriate information updated. Skills may also be added and updated when different service types are added, or when it is discovered that particular existing services require different skills or skills of differing importance as the system operates.

The contact center would typically have a supervisory terminal that permits the supervisor to add and amend skills. Also, the magnitude within each dimension can be defined by the supervisor, both for the agent vector and the service vector. One preferred way of doing this is to provide a graphical user interface (GUI) with a slidable indicator. The supervisor can then, for each skill, slide the indicator along a scale to indicate the proficiency level of an agent for a skill, the endpoints of the scale being the highest and lowest levels of proficiency. With respect to the level of importance of a skill for a particular service, a similar system can be used. Alternatively, discreet numbers or levels may be entered by the supervisor.

As still a further enhancement, the proficiency levels may be named, with relative weights of each level being assigned. For example, a skill may have three values: poor, acceptable, and excellent. The system would allow the operator to enter one of these three, and could then translate the levels into values such as one, two and three, respectively, for purposes of forming the skill score. Additionally, the system can be reconfigured to translate poor, acceptable, and excellent into 1, 3, and 10, respectively. This will cause the agent assignment algorithm to treat acceptable as only slightly better than poor, but excellent as MUCH better than either poor or acceptable.

While the above describes the preferred embodiment of the invention, various modifications and additions will be apparent to those of skill-in the art. Such modifications are intended to be covered by the following claims.

What is claimed:

1. A method of processing contacts in a contact center, each of said contacts definable as at least one of a plurality of types of contacts, each of said plurality of types of contacts requiring one or more skills to be possessed by an agent to which said contact will be assigned for processing, said method comprising the acts of:

providing a plurality of agents to process contacts;

defining an N-dimensional vector space, each of said N-dimensions corresponding to a particular skill required by an agent to process a contact, wherein N is greater than one;

for each said plurality of agents to process contacts, defining an N-dimensional agent vector, said N-dimensional agent vector being within said N-dimensional vector space and having a magnitude in each said N-dimension indicative of said agent's skill level with respect to a skill represented by said dimension;

for each said plurality of type of contact, defining a service vector, said service vector being within said N-dimensional vector space and having a magnitude in each N dimension indicative of the importance to processing of said type of contact of said skill represented by said dimension; and identifying at least one contact to be processed, in response to said identified at least one contact to be processed, performing the acts of:

electronically determining a plurality of dots products, each of said plurality of dot products between a service vector, indicative of the importance to processing of said contact identified for processing of said skill represented by said dimension for the type of contact to be processed, and an agent vector containing the plurality of skills possessed by each available agent; and assigning said contact to the available agent whose agent vector produces the largest dot product with said service vector.

2. The method of claim 1 further comprising ensuring that no agent with an agent vector that has a magnitude of zero in any dimension that the service vector has a magnitude of non-zero is assigned to process the contact.

3. The method of claim 1 wherein the service vectors and the agent vectors are normalized.

4. A method of processing contacts in a contact center, each of said contacts requiring a plurality of skills to be possessed by an agent to which said contact will be assigned, said method comprising the acts of:

providing a plurality of agents to process contacts;

defining an N-dimensional vector space, each of said N-dimensions corresponding to a particular skill, wherein N is greater than one;

for each agent to process contacts, defining an agent vector, said agent vector being within said vector space and having a magnitude in each dimension indicative of said each agent's skill level with respect to a skill represented by said dimension;

for each type of contact, defining a service vector, said service vector being within said vector space and having a magnitude in each dimension indicative of the importance to processing of said contact of said skill represented by said dimension; and electronically determining a correlation between an agent and a contact by a dot product between said agent vector containing the plurality of skills for said agent and said service vector containing the plurality of skills for said contact, wherein the dot product is indicative of how closely the agent's skill level matches the skills required to handle a particular contact.

5. The method of claim 4 further comprising assigning each contact to an agent having the largest dot product between said service vector for the contact to be processed and an agent vector for each agent in prescribed group for servicing said contract.

6. The method of claim 5 wherein said prescribed group comprises all available agents.

7. A method for processing contacts in a contact center, each of said contacts requiring a service to be performed to satisfy the contact, wherein the service has a plurality of skills that are performed by an agent to process the contact, said method comprising the acts of:

defining an N-dimensional vector space, each of said N-dimensions corresponding to a particular skill required by an agent to process a contact, wherein N is greater than one;

determining all of the services that are performed in the contact center;

responsive to determining the services, determining the plurality of skills required to process each of the services in the contact center;

responsive to determining the plurality of skills, providing a proficiency range for each of the plurality of skills;

determining a service vector for each of the plurality of skills, said service vector being within the N-dimensional vector space and having a magnitude in each N-dimension indicative of the importance to processing said type of contact of said skill represented by said dimension;

responsive to determining the plurality of skills, determining an agent vector for each agent for each skill, each said agent vector representing each agent's level of proficiency for each of the skills;

receiving a contact to be processed at the contact center;

responsive to the acts of determining the service vector and the agent vector, electronically determining a plurality of skill scores for each agent, wherein each of the skill scores is a dot product between each agent vector and each service vector indicative of how closely the agent's skill level matches the skills required to handle a particular contact; and assigning said contact to an available agent whose agent vector produces the largest dot product with said service vector.

8. The method for processing contacts in a contact center according to claim 7, further comprising the acts of:
responsive to determining the plurality of skills, determining a minimum skill level for each of the skills in a particular service; and
responsive to determining the minimum sill level for each skill, precluding any of the agents, having the skill level that is below the minimum skill level for any of the skills required for any of the services from handling any service that the agent had the skill level that was below the minimum skill level.

9. The method for processing contacts in a contact center according to claim 7, further comprising the act of editing the skills required to process each of the services.

10. The method for processing contacts in a contact center according to claim 7, further comprising the act of editing the importance level for any skill.

11. The method for processing contacts in a contact center according to claim 7, further comprising the act of editing the agent's level of proficiency for any skill.

* * * * *